US007983157B2

(12) United States Patent
Iwasaki

(10) Patent No.: US 7,983,157 B2

(45) Date of Patent: Jul. 19, 2011

(54) BANDWIDTH CONTROL SYSTEM, METHOD, AND PROGRAM STORAGE MEDIUM STORING PROGRAM THEREOF

(75) Inventor: Nobuyuki Iwasaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 11/971,365

(22) Filed: Jan. 9, 2008

(65) Prior Publication Data

US 2008/0181105 A1 Jul. 31, 2008

(30) Foreign Application Priority Data

Jan. 30, 2007 (JP) ................................ 2007-020070

(51) Int. Cl.
*G01R 31/08* (2006.01)

(52) U.S. Cl. ...................................................... 370/229

(58) Field of Classification Search ........................ None
See application file for complete search history.

(56) References Cited

U.S. PATENT DOCUMENTS

| | | | | |
|---|---|---|---|---|
| 7,218,639 | B2 | 5/2007 | Matsufuru | |
| 2002/0054568 | A1 * | 5/2002 | Hoogenboom et al. | 370/235.1 |
| 2007/0110099 | A1 * | 5/2007 | Ozaki | 370/468 |

FOREIGN PATENT DOCUMENTS

| | | |
|---|---|---|
| JP | 2002-152239 | 5/2002 |
| JP | 2002-252625 | 9/2002 |
| JP | 2003-204343 | 7/2003 |

OTHER PUBLICATIONS

Notification of Reasons for Refusal dated Mar. 15, 2011, from the corresponding Japanese Application.

* cited by examiner

*Primary Examiner* — Chi H Pham
*Assistant Examiner* — Fan Ng
(74) *Attorney, Agent, or Firm* — Katten Muchin Rosenman LLP

(57) ABSTRACT

When a plurality of pre-stage packet controllers receive an instruction on transmission of the priority information from a post-stage packet controller, they derive priority information on the basis of the ratios of bandwidths which can be used at minimum by the user devices, and statuses of storing packets in the buffers, and transmit the priority information to the post-stage packet controller. The post-stage packet controller then selects a pre-stage packet controller to be actually given packet transmission permission on the basis of the priority information received from the plurality of pre-stage packet controllers, and transmits an instruction on packet transmission permission to the selected pre-stage packet controller. The pre-stage packet controller which has received the instruction on packet transmission permission from the post-stage packet controller then transmits a packet to the post-stage packet controller.

4 Claims, 16 Drawing Sheets c1
c2
c3
c4
c5
c6
c7
c8
c9
A1
A2
A3
HIT c1
c2
c3
c4
c5
c6
c7
c8
c9
A1
A2
A3
HIT
HIT
HIT
HIT c1
c2
c3
c4
c5
c6
c7
c8
c9
A1
A2
A3
HIT
HIT
HIT
HIT

COMPUTER
100
I/O PORT
101a
I/O PORT
101b
I/O PORT
101c
RAM
106
SEARCH MATRIX DATA
106a
HDD
105
SEARCH MATRIX TABLE
105a
107
CPU
103
SEARCH MATRIX GENERATION PROCESS
103a
TRANSMISSION PERMISSION PROCESS
103b
PACKET TRANSMISSION /RECEPTION PROCESS
103c
ROM
104
SEARCH MATRIX GENERATION PROGRAM
104a
TRANSMISSION PERMISSION PROGRAM
104b
PACKET TRANSMISSION /RECEPTION PROGRAM
104c
I/O PORT
102

BANDWIDTH CONTROL SYSTEM, METHOD, AND PROGRAM STORAGE MEDIUM STORING PROGRAM THEREOF

BACKGROUND OF THE INVENTION

1. Field of the Invention

The present invention relates to a bandwidth control system, especially to a system including a plurality of pre-stage packet multiplexers which receive packets from user devices, and a post-stage packet multiplexer which receives packets from the plurality of pre-stage packet multiplexers and transmits the received packets to a network.

2. Description of the Related Art

In data transfer on a network, one of techniques for implementing data transfer reflecting contracts with users is bandwidth control. One example of the bandwidth control is that, when a plurality of users concurrently transmit packets in a specific bandwidth and total data amount exceeds the bandwidth, the system ensures a contracted minimum bandwidth for each user in accordance with the respective contract made in advance, without applying a first-come-first-served principle. Another example is that, even when there is no packet transmission by other users, the system does not allow a single user to monopolize a specific bandwidth and sets an upper limit to the bandwidth for each user.

In recent years, with the increase in the number of users using networks, a packet multiplexer conducting the above-described bandwidth control is configured with not a single packet multiplexer but a plurality of packet multiplexers as well as a multi-stage configuration to meet such a large number of users.

Specifically, such a packet multiplexer has a dual structure including a pre-stage and a post-stage. The pre-stage is consisted of a plurality of packet multiplexers which receive packets from users and transmit the packets to the post-stage. The post-stage is consisted of a packet multiplexer which receives the packets from the pre-stage and transmits them to a network. The pre-stage packet multiplexer performs bandwidth control under contracts with users and the post-stage packet multiplexer performs a predetermined bandwidth control.

As a technique concerning bandwidth control, Japanese Unexamined Patent Application Publication No. 2002-252625 discloses a technique wherein buffers are produced as many as the number of virtual local area networks (VLANs) allocated to physical lines connected to output ports of a rooter, and packets accumulated in the buffers are transmitted by a round-robin approach.

In the above-described related art, a problem occurs in that fairness cannot be ensured among users connected to different pre-stage packet multiplexers. Another problem is that it is difficult to increase the number of users. Specifically, fairness among users connected to the same pre-stage packet multiplexer may be ensured, but in a specific situation (e.g., when the bandwidth is congested in one pre-stage packet multiplexer and is uncrowded in another pre-stage packet multiplexer), unfairness occurs among users who have made the contracts on the same condition but connected to different pre-stage packet multiplexers. Also, since installing more pre-stage packet multiplexer(s) requires a large capacity of packet buffer for the post-stage packet multiplexer, it is not easy to increase the number of users. Even if the technique disclosed in the above-described patent document is applied, these problems cannot be solved.

SUMMARY

The present invention has been made to solve the above-described problems associated with the related art. It is an object of the present invention to provide a system allowing fairness to be ensured among users connected to different pre-stage packet multiplexers.

According to a first aspect of the present invention, there is provided a bandwidth control system which receives packets from a plurality of user devices and transmits the packets to a network, wherein each of the user devices cooperates with the bandwidth control system under one of contracts which contain contract provisions which relate to communication services. The bandwidth control system includes: a plurality of pre-stage controller, each of which receives a packet from a corresponding user device, derives, on the basis of the contract provisions of the corresponding user device, control data for controlling bandwidth, transmits the control data, and transmits the packet upon receiving packet transmission permission; and a post-stage controller which receives the control data from the pre-stage controller, selects, on the basis of the control data, a pre-stage controller which is given the packet transmission permission, transmits the packet transmission permission to the selected pre-stage controller, receives the packet from the selected pre-stage controller, and transmits the packet to the network.

The pre-stage controller of the bandwidth control system may transmit the control data to the post-stage controller by utilizing an unused bandwidth consisted of an inter-packet spacing. The post-stage controller of the bandwidth control system may also transmit the packet transmission permission to the selected pre-stage controller by utilizing the unused bandwidth.

According to a second aspect of the present invention, there is provided a program storage medium readable by a computer, wherein the program storage medium stores a program of instructions for the computer to execute a bandwidth control method for receiving packets from a plurality of user devices and transmitting the packets to a post-stage controller. The post-stage controller receives the packets from the computer and transmits the packets to a network, and each of the user devices cooperates with the computer under one of contracts which contain contract provisions which relate to communication services. The bandwidth control method includes the steps of: receiving a packet from a corresponding user device; deriving, on the basis of the control provisions of the corresponding user device, control data for controlling bandwidth; transmitting the control data to the post-stage controller; and transmitting the packet upon receiving packet transmission permission from the post-stage controller.

According to a third aspect of the present invention, there is provided a program storage medium readable by a computer, wherein the program storage medium stores a program of instructions for the computer to execute a bandwidth control method for receiving packets from a plurality of pre-stage controllers and transmitting the packets to a network. The pre-stage controller receives packets from a plurality of user devices and transmits the packets to the computer, and each of the user devices cooperates with the pre-stage controller under one of contracts which contain contract provisions which relate to communication services. The bandwidth control method includes the steps of: receiving control data for controlling bandwidth from the pre-stage controller, wherein the control data has been derived on the basis of the control provisions of the corresponding user device; selecting, on the basis of the control data, a pre-stage controller which is given packet transmission permission; transmitting the packet transmission permission to the selected pre-stage controller; receiving a packet from the selected pre-stage controller; and transmitting the packet to the network.

According to a fourth aspect of the present invention, there is provided a bandwidth control method which is performed by a pre-stage controller which receives packets from a plurality of user devices and transmits the packets to a post-stage controller, wherein the post-stage controller receives the packets from the pre-stage controller and transmits the packets to a network. Each of the user devices cooperates with the pre-stage controller under one of contracts which contain contract provisions which relate to communication services. The bandwidth control method includes the steps of: receiving a packet from a corresponding user device; deriving, on the basis of the control provisions of the corresponding user device, control data for controlling bandwidth; transmitting the control data to the post-stage controller; and transmitting the packet upon receiving packet transmission permission from the post-stage controller.

According to a fifth aspect of the present invention, there is provided a bandwidth control method which is performed by a post-stage controller which receives packets from a plurality of pre-stage controllers and transmits the packets to a network, wherein the pre-stage controller receives a packet from a user device and transmits the packet to the post-stage controller. The user device has made a contract with the pre-stage controller. The bandwidth control method includes the steps of: receiving the contract information from the pre-stage controller; selecting, on the basis of the contract information, a pre-stage controller to be given packet transmission permission; transmitting the packet transmission permission to the selected pre-stage controller; receiving the packet from the selected pre-stage controller; and transmitting the packet to the network.

According to a fifth aspect of the present invention, there is provided a bandwidth control method which is performed by a post-stage controller which receives packets from a plurality of pre-stage controllers and transmits the packets to a network, wherein the pre-stage controller receives packets from a plurality of user devices and transmits the packets to the post-stage controller, and each of the user devices cooperates with the pre-stage controller under one of contracts which contain contract provisions which relate to communication services. The bandwidth control method includes the steps of: receiving control data for controlling bandwidth from the pre-stage controller, wherein the control data has been derived on the basis of the control provisions of the corresponding user device; selecting, on the basis of the control data, a pre-stage controller to be given packet transmission permission; transmitting the packet transmission permission to the selected pre-stage controller; receiving a packet from the selected pre-stage controller; and transmitting the packet to the network.

DESCRIPTION OF THE PREFERRED EMBODIMENTS

Hereinafter, a bandwidth control system comprising pre-stage packet controllers and a post-stage packet controller according to embodiments of the present invention will be described with reference to the accompanying drawings. In the descriptions below, the outline and features of a bandwidth control system according to a first embodiment, the configurations of the pre-stage packet controller and the post-stage packet controller, and the flows of process in the pre-stage packet controller and the post-stage packet controller will be given in this order. Thereafter, other embodiments will be described.

First Embodiment

Figure 1:
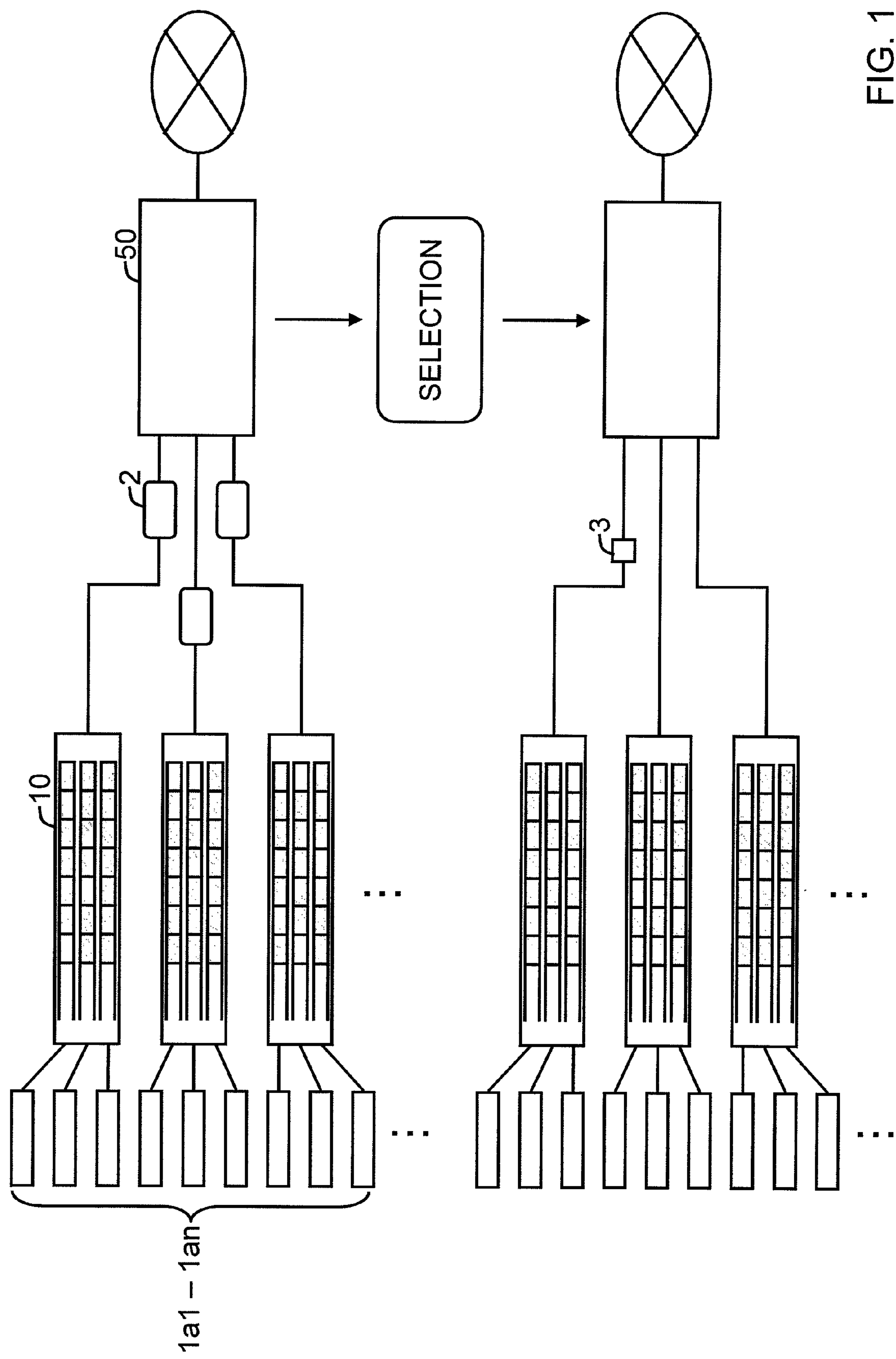
FIG. 1 is a diagram illustrating an outline and features of a bandwidth control system according to a first embodiment of the present invention.

First, the outline and features of a bandwidth control system according to a first embodiment of the present invention are described with reference to FIG. 1. FIG. 1 is a diagram illustrating an outline and features of a bandwidth control system according to a first embodiment of the present invention.

The outline of the bandwidth control system according to the first embodiment will now be described below. As shown in FIG. 1, the bandwidth control system includes a plurality of pre-stage packet controllers 10 and a post-stage packet controller 50. The pre-stage packet controller 10 receives packets from user devices 1*a*1 to 1*an* and transmits them to the post-stage packet controller 50. The post-stage packet controller 50 receives the packets transmitted from the plurality of pre-stage packet controllers 10 and transmits them to a network. Here, the pre-stage packet controllers 10 perform bandwidth control for distributing limited bandwidths or for narrowing down bandwidths by storing the packets transmitted from the user devices in buffers provided for each of the user devices. The main features of the above-described bandwidth control system according to the first embodiment of the present invention lie in its capability of ensuring fairness among users connected to different pre-stage multiplexers, and of easily increasing the number of users.

The above-described main features of the bandwidth control system will be described in more detail. The plurality of pre-stage packet controllers 10 transmit priority information 2 derived from the contract provisions contained in the contracts on the user devices 1*a*1 to 1*an* to the post-stage packet controller 50. Specifically, upon receiving an instruction on transmission of the priority information from the post-stage packet controller 50, the pre-stage packet controllers 10 derive the priority information 2 on the basis of the ratios of bandwidths which can be used at minimum by the user devices 1*a*1 to 1*an* and statuses of storing packets in the buffers, and transmit the priority information 2 to the post-stage packet controller 50. A method for deriving the priority information by the pre-stage packet controllers 10 will be described later.

The post-stage packet controller 50 selects a pre-stage packet controller 10 to which packet transmission permission is actually given on the basis of the priority information, and transmits an instruction on packet transmission permission to the selected pre-stage packet controller 10. Specifically, upon receiving the priority information transmitted from the plurality of pre-stage packet controllers 10 connected to the post-stage packet controller 50, the post-stage packet controller 50 selects a pre-stage packet controller 10 to which packet transmission permission is actually given on the basis of the priority information, and transmits an instruction on packet transmission permission to the selected pre-stage packet controller 10. A method for selecting the pre-stage packet controller 10 to which the packet transmission permission is actually given on the basis of the priority information will be described later.

When the selected pre-stage packet controller 10 has received an instruction on packet transmission permission from the post-stage packet controller 50, the selected pre-stage packet controller 10 transmits a packet 3 to the post-stage packet controller 50. Specifically, of the plurality of pre-stage packet controllers 10, the selected pre-stage packet controller 10 which has been received the instruction on packet transmission permission from the post-stage packet controller 50 extracts a packet 3 which actually has a turn to be transmitted, from the buffer in which the packet 3 is stored, and transmits the packet 3 to the post-stage packet controller 50.

Therefore, according to the first embodiment, the bandwidth control system may ensure fairness among users connected to different pre-stage multiplexers, and to easily increase the number of users.

Figure 2:
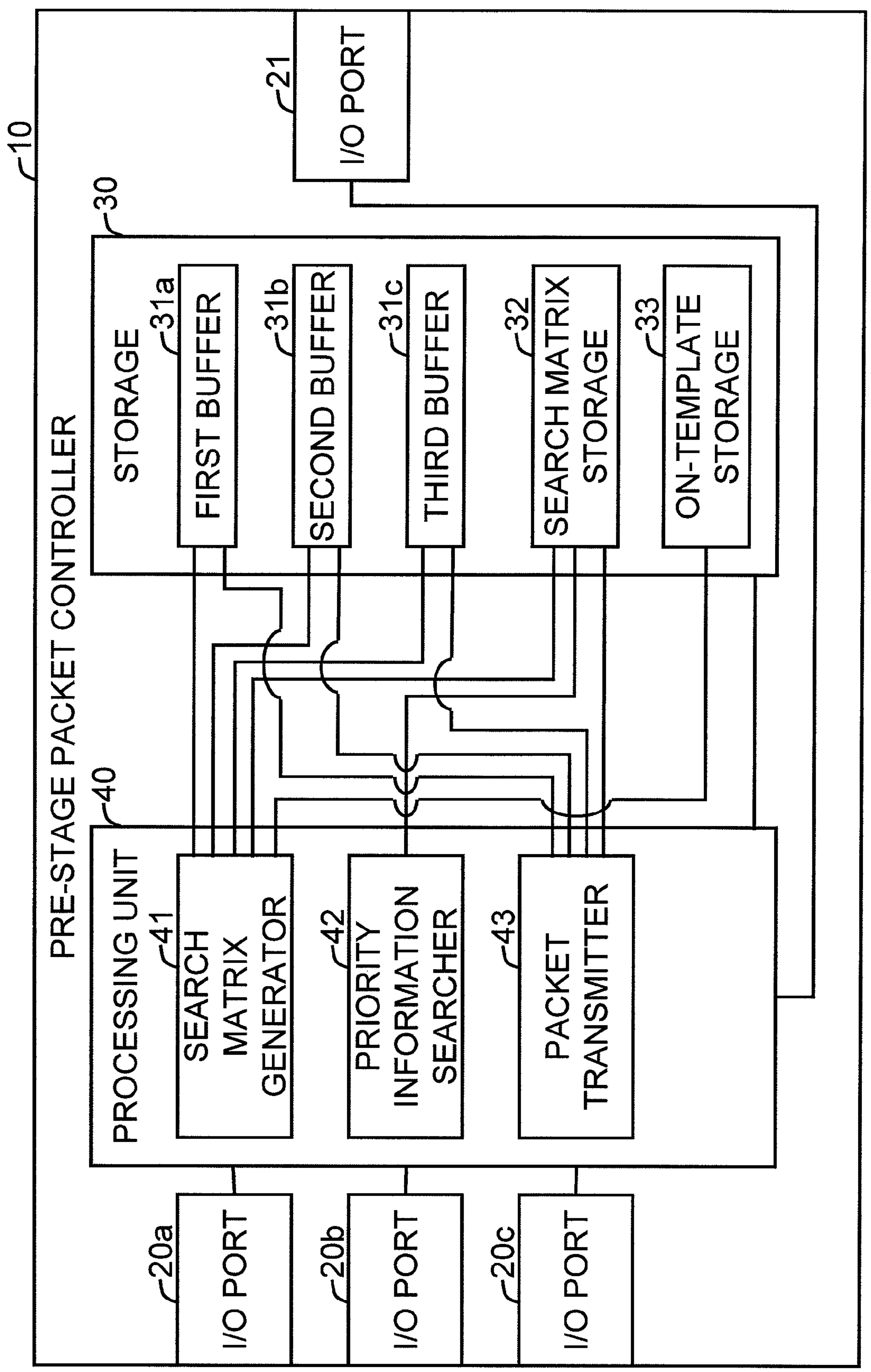
FIG. 2 is a block diagram illustrating a configuration of a pre-stage packet controller in the bandwidth control system according to the first embodiment of the present invention.
Figure 3:
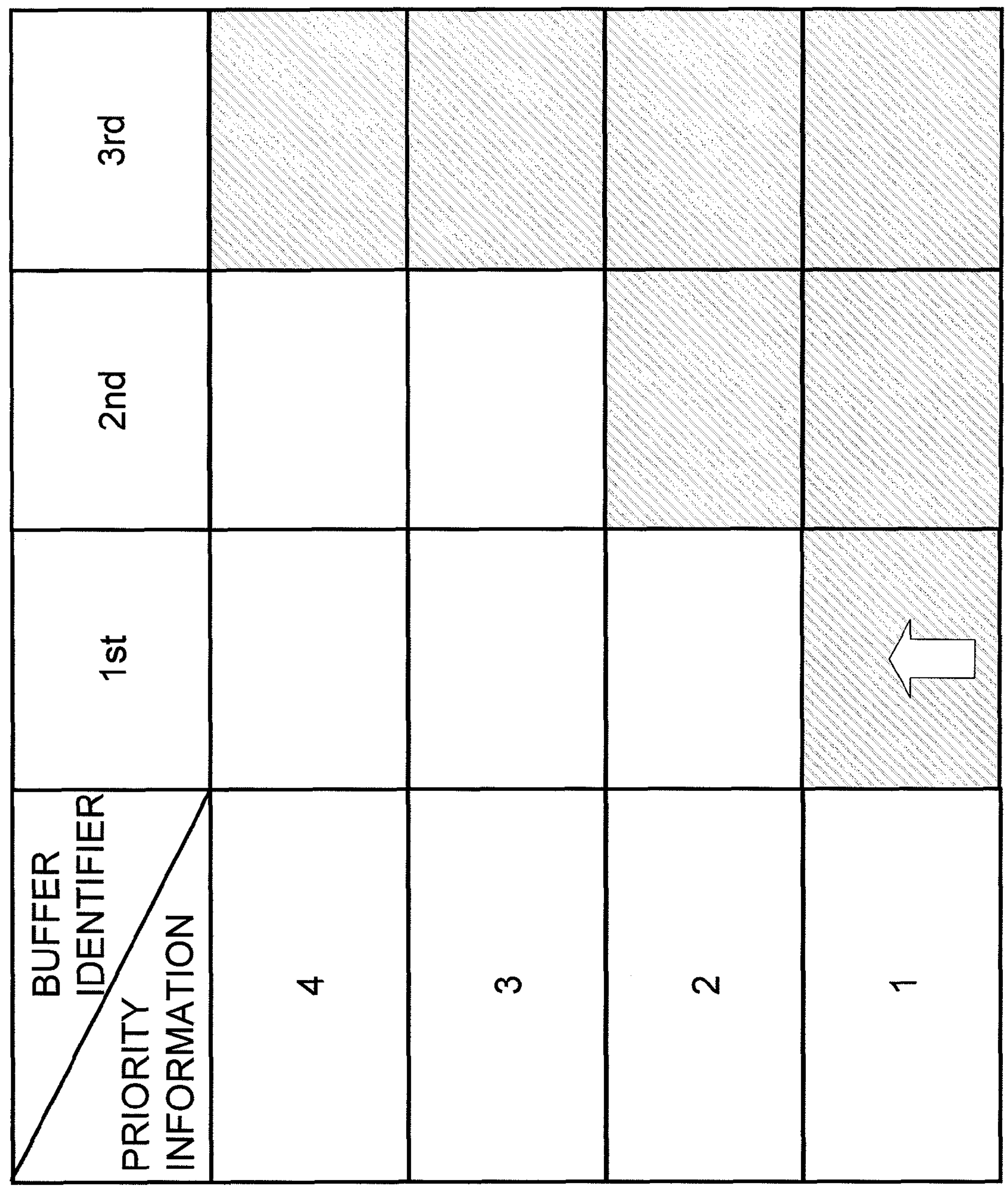
FIG. 3 is a diagram illustrating an example of information stored in a search matrix storage.
Figure 4:
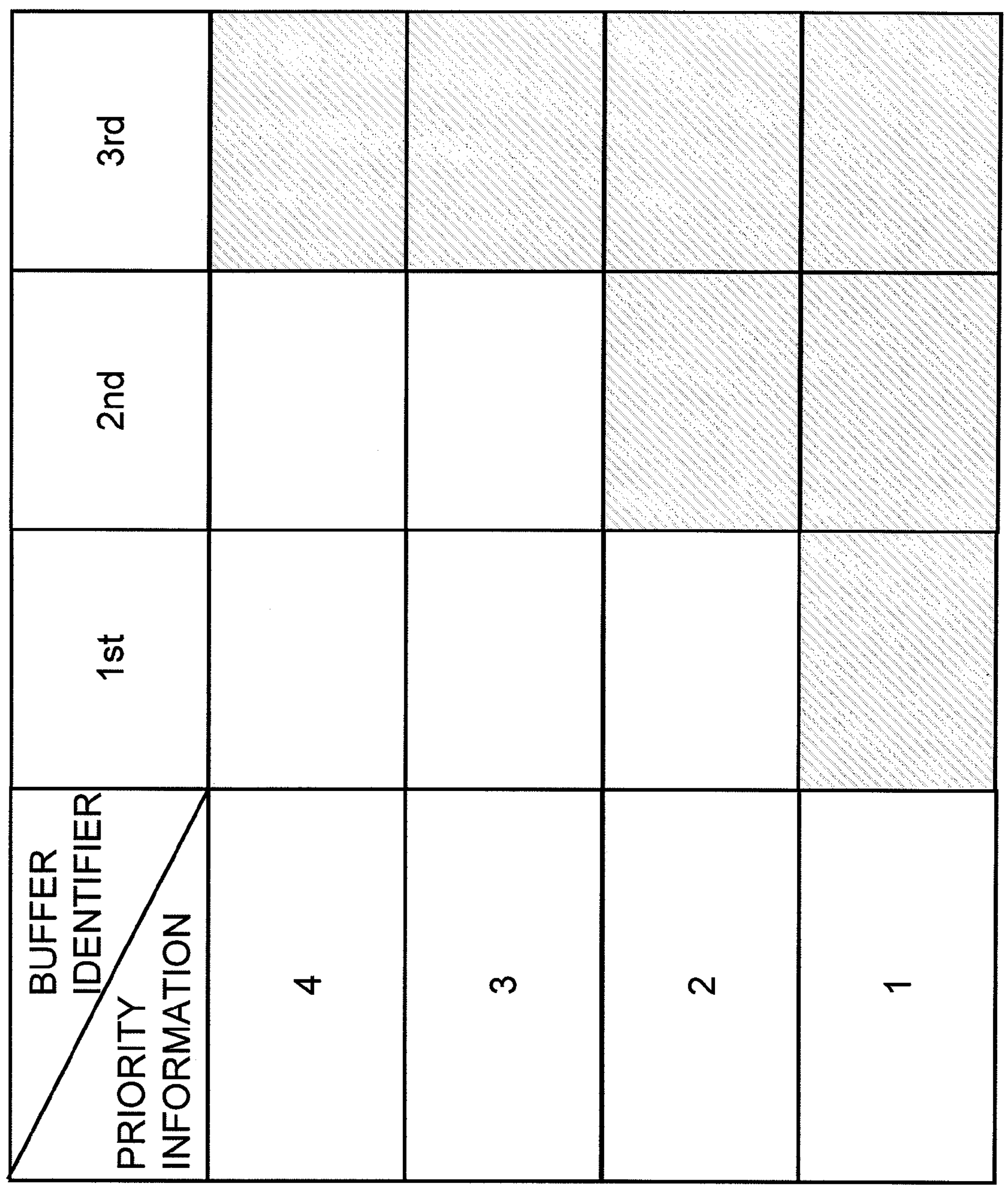
FIG. 4 is a diagram illustrating an example of information stored in an on-template storage.

Next, the configuration of the pre-stage packet controller 10 shown in FIG. 1 is described with reference to FIGS. 2, 3, and 4. FIG. 2 is a block diagram illustrating a configuration of a pre-stage packet controller in the bandwidth control system according to the first embodiment of the present invention. FIG. 3 is a diagram illustrating an example of information stored in a search matrix storage. FIG. 4 is a diagram illustrating an example of information stored in an on-template storage.

As shown in FIG. 2, each of the pre-stage packet controllers 10 includes I/O (input/output) ports 20*a*, 20*b*, and 20*c*, an I/O port 21, a storage 30, and a processing unit 40.

Each of the I/O ports 20*a*, 20*b*, and 20*c* is provided for each user device and inputs a packet transmitted from the corresponding user device into the pre-stage packet controller 10.

The I/O port 21 is provided for the post-stage packet controller 50, outputs a packet or control information to outside of the pre-stage packet controller 10, and also inputs control information transmitted from the post-stage packet controller 50 into the pre-stage packet controller 10.

The storage 30 stores data and programs necessary for various processes of the processing unit 40. The storage 30 includes a first buffer 31*a*, a second buffer 31*b*, a third buffer 31*c*, a search matrix storage 32, and an on-template storage 33.

Each of the first buffer 31*a*, the second buffer 31*b*, and the third buffer 31*c* is provided for each user device, and stores packets inputted via the I/O ports 20*a*, 20*b*, and 20*c* respectively into the pre-stage packet controller 10. Specifically, the first buffer 31*a* receives a packet transmitted from a predetermined user device via the I/O port 20*a* and stores it. Also, the second buffer 31*b* receives a packet transmitted from a predetermined user device via the I/O port 20*b* and stores it. Likewise, the third buffer 31*c* receives a packet transmitted from a predetermined user device via the I/O port 20*c* and stores it.

The search matrix storage 32 stores on-information and a search start pointer embedded in a cell of a matrix.

Specifically, as shown in FIG. 3, the search matrix storage 32 stores a matrix wherein the priority information is related to the rows of the matrix and the buffer identifier is related to the columns thereof, and stores the on-information and the search start pointer embedded in a cell of the matrix, to thereby memorize it as a search matrix. The search matrix storage 32 stores a matrix created in advance by an operator, wherein various pieces of information are related to the rows and the columns of the matrix.

A method for deriving the priority information will be now described. First, the number of priority grades is determined in accordance with the maximum value of integral ratios of bandwidths which can be contractually used at minimum by the user devices connected to the I/O ports 20*a*, 20*b*, and 20*c*. Priority information is then defined, which can determine relative precedence in accordance with the grades. The operator creates a matrix by taking the maximum value as the number of columns, and taking the number of buffers in the storage 30 as the number of rows. The operator relates the priority information to the rows of the matrix and the buffer identifier to the columns thereof. Furthermore, the operator embeds the search start pointer in a cell at the initial position.

Referring back to the block diagram, for example, as shown in FIG. 3, the search matrix storage 32 stores a search matrix which has on-information in a cell at the fourth row and the first column, a cell at the third row and the second column, a cell at the fourth row and the second column, and all cells on the third column, and has the search start pointer in the cell at the fourth row and the first column.

The on-template storage 33 stores a matrix having on-information embedded in a cell thereof.

Specifically, as shown in FIG. 4, the on-template storage 33 stores a matrix wherein the priority information is related to the rows of the matrix and the buffer identifier is related to the columns thereof, and stores the on-information embedded in a cell of the matrix, to thereby memorize it as a template. Like as in the case of the search matrix storage 32, the on-template storage 33 stores a matrix created in advance by an operator, wherein various pieces of information are related to the rows and the columns of the matrix. The operator, as described above, creates a matrix, and relates the priority information to the rows of the matrix and the buffer identifier to the columns thereof. Furthermore, the operator takes one cell of the matrix as "weight 1", and embeds on-information in descending order of the priority information which corresponds to integral ratio of the bandwidth, thereby reflecting to the matrix the ratios of bandwidths which can be contractually used at minimum by the user devices connected to the I/O ports 20*a*, 20*b*, and 20*c*.

The processing unit 40 has an internal memory for storing control programs such as an operating system (OS), programs specifying various procedures, and required data, and performs various processes. The processing unit 40 includes a search matrix generator 41, a priority information searcher 42, and a packet transmitter 43.

The search matrix generator 41 generates a search matrix on the basis of storage status of packets in the first buffer 31*a*, second buffer 31*b*, and third buffer 31*c*.

Specifically, when a packet is stored in the first buffer 31*a*, the second buffer 31*b* or the third buffer 31*c*, the search matrix generator 41 reads, from a template stored in the on-template storage 33, priority information corresponding to the row of the cell embedded with on-information in the column corresponding to buffer identifier of the buffer in which the packet is stored. The search matrix generator 41 embeds the on-information in the matrix stored in the search matrix storage 32 on the basis of the read priority information and the buffer identifier. Upon disappearance of packets in the first buffer 31*a*, the second buffer 31*b*, or the third buffer 31*c*, the search matrix generator 41 deletes, from the matrix stored in the search matrix storage 32, the on-information embedded in a cell on the column corresponding to the buffer identifier of the packet free buffer.

For example, when a packet is stored in the first buffer 31*a*, the search matrix generator 41 reads, from the template stored in the on-template storage 33, priority information "1" corresponding to the row of the cell embedded with the on-information in the column corresponding to buffer identifier "1st" of the first buffer 31*a*. The search matrix generator 41 then embeds the on-information in a cell at the fourth row and the first column in the matrix stored in the search matrix storage 32 on the basis of the priority information "1" and the buffer identifier "1st".

The priority information searcher 42 searches priority information to be transmitted to the post-stage packet controller 50 on the basis of the search matrix. Specifically, when the priority information searcher 42 has received from the post-stage packet controller 50 via the I/O port 21 a search start instruction which is an instruction on transmission of the priority information, the priority information searcher 42 reads the search matrix from the search matrix storage 32, and searches for a cell in which on-information is actually embedded, starting from the cell in which the search start pointer is embedded, in a predetermined order (for example, in FIG. 3, since the search start pointer is embedded in a cell at the fourth row and the first column, the search is performed from the cell to cells at the same row and the second to third columns; cells at the third row and the first to third columns; cells at the second row and the first to third columns; and cells at the first row and the first to third columns. If the search start pointer is embedded in a cell other than the cell at the above-described fourth row and the first column, then, after the search has been performed up to a cell at the first row and the third column, the search is performed again in the same order from the fourth row and the first column to the cell in which the search start pointer is embedded). Upon finding a cell in which the on-information is embedded, the priority information searcher 42 transmits the priority information corresponding to the row of the cell, to the post-stage packet controller 50, and after having extracted the search start pointer from the original cell, embeds it in the cell found to be embedded with the on-information. When the priority information searcher 42 has not found a cell in which the on-information is embedded, as the result of the search in the predetermined order, the priority information searcher 42 transmits information indicating "no priority" to the post-stage packet controller 50.

When the packet transmitter 43 has received an instruction on packet transmission permission from the post-stage packet controller 50, the packet transmitter 43 transmits a packet to the post-stage packet controller 50. Specifically, when the packet transmitter 43 has received an instruction on packet transmission permission via the I/O port 21, the packet transmitter 43 reads a search matrix from the search matrix storage 32. Then, the packet transmitter 43 extracts a predetermined amount of packets (e.g., one packet) from the buffer identified by the buffer identifier corresponding to the column of the cell in which the search start pointer is embedded, and transmits the extracted packets to the post-stage packet controller 50. After having transmitted the extracted packets to the post-stage packet controller 50, the packet transmitter 43 extracts the search start pointer from the original cell, and embeds it in a next cell.

The pre-stage packet: controller 10 exchanges various pieces of data with the post-stage packet controller 50 via the single I/O port 21 and transmits priority information utilizing an unused bandwidth consisting of an inter-packet spacing.

Figure 5:
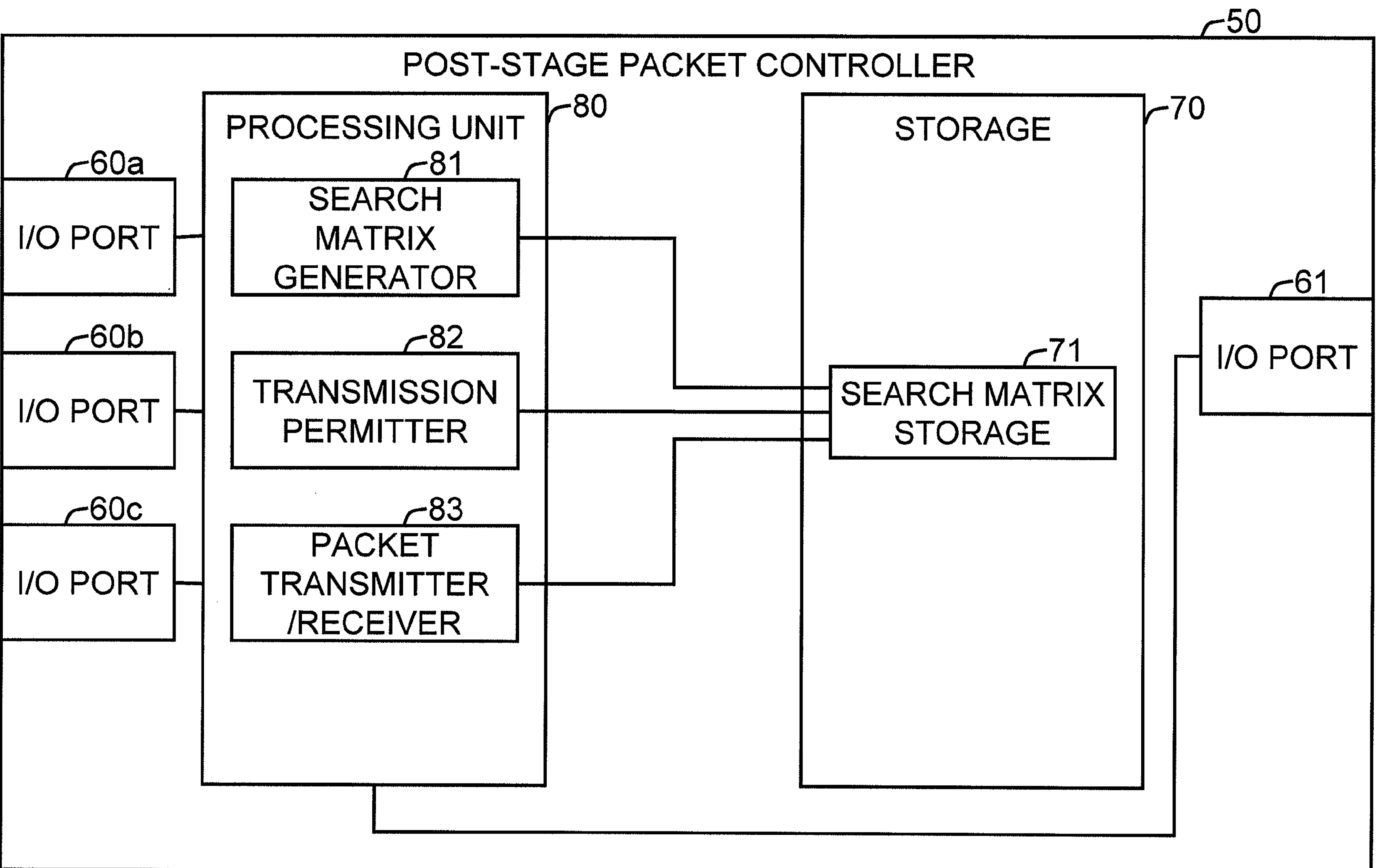
FIG. 5 is a block diagram illustrating a configuration of a post-stage packet controller in the bandwidth control system according to the first embodiment of the present invention.
Figure 6:
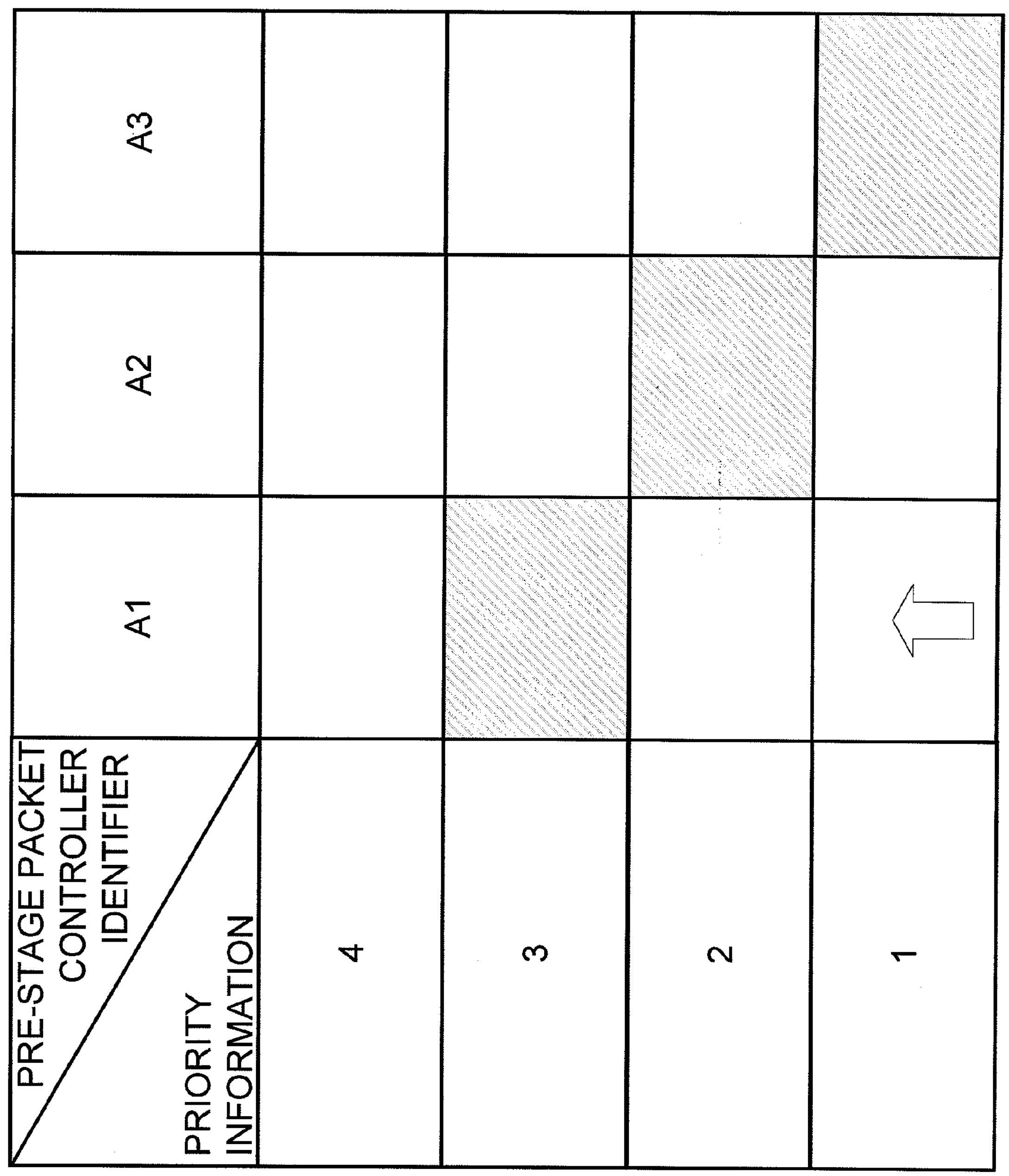
FIG. 6 is a diagram illustrating an example of information stored in the search matrix storage.

Next, the configuration of the post-stage packet controller 50 shown in FIG. 1 will be described with reference to FIGS. 5 and 6. FIG. 5 is a block diagram illustrating a configuration of a post-stage packet controller in the bandwidth control system according to the first embodiment of the present invention. FIG. 6 is a diagram illustrating an example of information stored in the search matrix storage.

As shown in FIG. 5, the post-stage packet controller 50 includes I/O ports 60*a*, 60*b*, and 60*c*, an I/O port 61, a storage 70, and a processing unit 80.

Each of the I/O ports 60*a*, 60*b*, and 60*c* is provided for each pre-stage packet controller 10, inputs a packet or control information transmitted from corresponding pre-stage packet controller 10 into the post-stage packet controller 50, and also outputs control information to outside of the post-stage packet controller 50.

The I/O port 61 is provided for a node which is included in an outer network, and outputs a packet to outside of the post-stage packet controller 50.

The storage 70 stores data and programs necessary for various processes of the processing unit 80. The storage 70 has a search matrix storage 71 which stores on-information and a search start pointer embedded in a cell of a matrix.

Specifically, as shown in FIG. 6, the search matrix storage 71 stores a matrix wherein the priority information is related to the rows of the matrix and a pre-stage packet controller identifier is related to the columns thereof, and stores on-information and a search start pointer embedded in a cell of the matrix, to thereby memorize it as a search matrix. The search matrix storage 71 stores a matrix created in advance by an operator, wherein various pieces of information are related to the rows and the columns of the matrix. The operator, as described above, creates a matrix and relates the same priority information which has been defined in the pre-stage packet controller 10 to the rows of the matrix and the pre-stage packet controller identifier to the columns thereof.

The processing unit 80 has an internal memory for storing control programs such as an operating system (OS), programs specifying various procedures, and required data, and performs various processes. The processing unit 80 includes a search matrix generator 81, a transmission permitter 82, and a packet transmitter/receiver 83.

The search matrix generator 81 generates a search matrix on the basis of priority information transmitted from the pre-stage packet controllers 10.

Specifically, at the timing of the search start instruction, the search matrix generator 81 transmits a search start instruction to each of the pre-stage packet controllers 10 via the I/O ports 60*a*, 60*b*, and 60*c*. Upon receiving the priority information from the pre-stage packet controllers 10 via the I/O ports 60*a*, 60*b*, and 60*c*, the search matrix generator 81 embeds the on-information in the matrix stored in the search matrix storage 71, in the respective cell corresponding to the pre-stage packet controller identifier and the priority information of the pre-stage packet controller 10, and generates a search matrix.

The search matrix generator 81 then outputs a control signal to the transmission permitter 82.

For example, as shown in FIG. 6, when the search matrix generator 81 has received priority information "3" from a pre-stage packet controller 10 identified by pre-stage packet controller identifier "A1", priority information "2" from a pre-stage packet controller 10 identified by pre-stage packet controller identifier "A2", and priority information "1" from a pre-stage packet controller 10 identified by pre-stage packet controller identifier "A3", the search matrix generator 81 embeds the on-information in a cell at the second row and the first column, a cell at the third row and the second column, and a cell at the fourth row and the third column.

The transmission permitter 82 selects the pre-stage packet controller 10 to be actually given packet transmission permission on the basis of the priority information, and transmits an instruction on packet transmission permission to the selected pre-stage packet controller 10. Specifically, upon receiving a control signal from the search matrix generator 81, the transmission permitter 82 reads a search matrix from the search matrix storage 71, and searches for a cell in which on-information is actually embedded, starting from the cell in which the search start pointer is embedded, in a predetermined order (for example, in FIG. 6, since the search start pointer is embedded in a cell at the fourth row and the first column, the search is performed from the cell to cells at the same row and the second to third columns; cells at the third row and the first to third columns; cells at the second row and the first to third columns; and cells at the first row and the first to third columns. If the search start pointer is embedded in a cell other than the cell at the above-described fourth row and the first column, then, after the search has been performed up to the cell at the first row and the third column, it is performed again in the same order from the fourth row and the first column to the cell in which the search start pointer is embedded). Upon finding a cell in which the on-information is embedded, the transmission permitter 82 transmits an instruction on packet transmission permission to the pre-stage packet controller 10 identified by the pre-stage packet controller identifier corresponding to the column in the cell found to be embedded with the on-information. After having transmitted the instruction on packet transmission permission, the transmission permitter 82 extracts the search start pointer from the original cell, and embeds it in a next cell.

The packet transmitter/receiver 83 receives a packet from a pre-stage packet controller 10 via the I/O port 60*a*, 60*b*, or 60*c*, and transmits the received packet to a node included in a network via the I/O port 61.

The post-stage packet controller 50 exchanges various pieces of data with each of the pre-stage packet controllers 10 via a respective one of the I/O ports 60*a*, 60*b*, and 60*c* and transmits the search start instruction or the instruction on packet transmission permission utilizing an unused bandwidth consisting of an inter-packet spacing.

Figure 7:
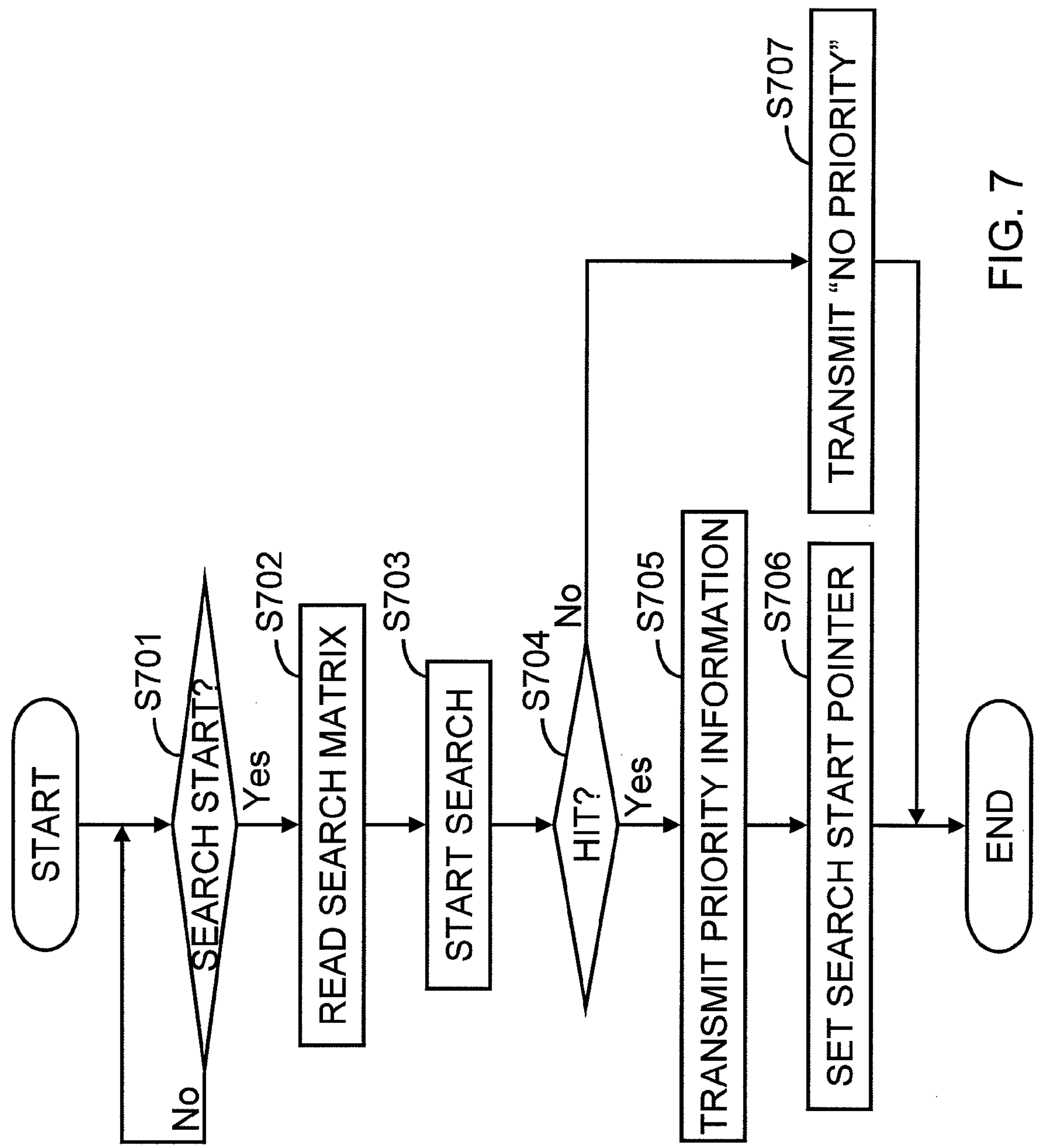
FIG. 7 is a flowchart illustrating a flow of priority information transmission process.
Figure 8:
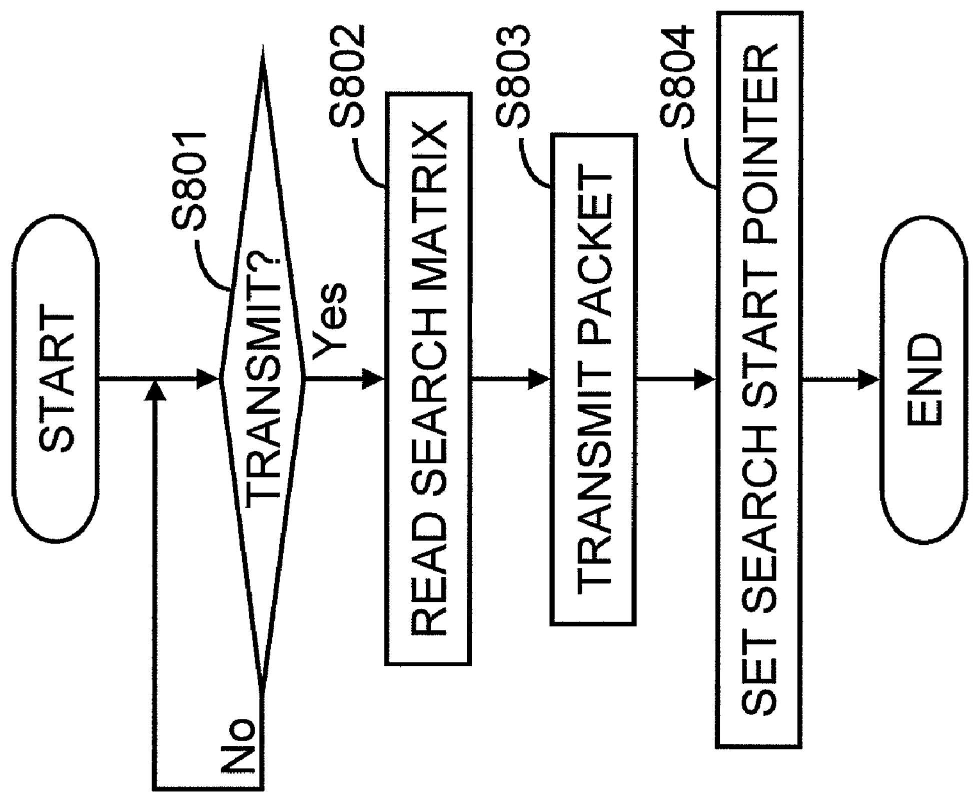
FIG. 8 is a flowchart illustrating a flow of packet transmission process.

Next, the process performed by the pre-stage packet controllers 10 will be described with reference to FIGS. 7 and 8. FIG. 7 is a flowchart illustrating a flow of priority information transmission process. FIG. 8 is a flowchart illustrating a flow of packet transmission process.

As shown in FIG. 7, when the pre-stage packet controller 10 has received a search start instruction from the post-stage packet controller 50 (step S701: Yes), the priority information searcher 42 reads a search matrix from the search matrix storage 32 (step S702). The priority information searcher 42 then searches for a cell in which on-information is actually embedded, in a predetermined order starting from a cell in which the search start pointer is embedded (step S703).

When the priority information searcher 42 has found a cell in which the on-information is embedded (step S704: Yes), the pre-stage packet controller 10 transmits the priority information corresponding to the row of the cell, to the post-stage packet controller 50 (step S705), extracts the search start pointer from the original cell and embeds it in the cell found to be embedded with the on-information (step S706), thereby ending the process. On the other hand, when the priority information searcher 42 has not found a cell in which the on-information is embedded (step S704: No), the pre-stage packet controller 10 transmits information indicating "no priority" to the post-stage packet controller 50 (step S707).

As shown in FIG. 8, when the pre-stage packet controller 10 has received an instruction on packet transmission permission from the post-stage packet controller 50 (step S801: Yes), the packet transmitter 43 reads the search matrix from the search matrix storage 32 (step S802), extracts a predetermined amount of packets from the buffer identified by the buffer identifier corresponding to the column of the cell in which the search start pointer is embedded, and transmits the packets to the post-stage packet controller 50 (step S803). Then, the pre-stage packet controller 10 extracts the search start pointer from the original cell and embeds it in a next cell (step S804), thereby ending the process.

Figure 9:
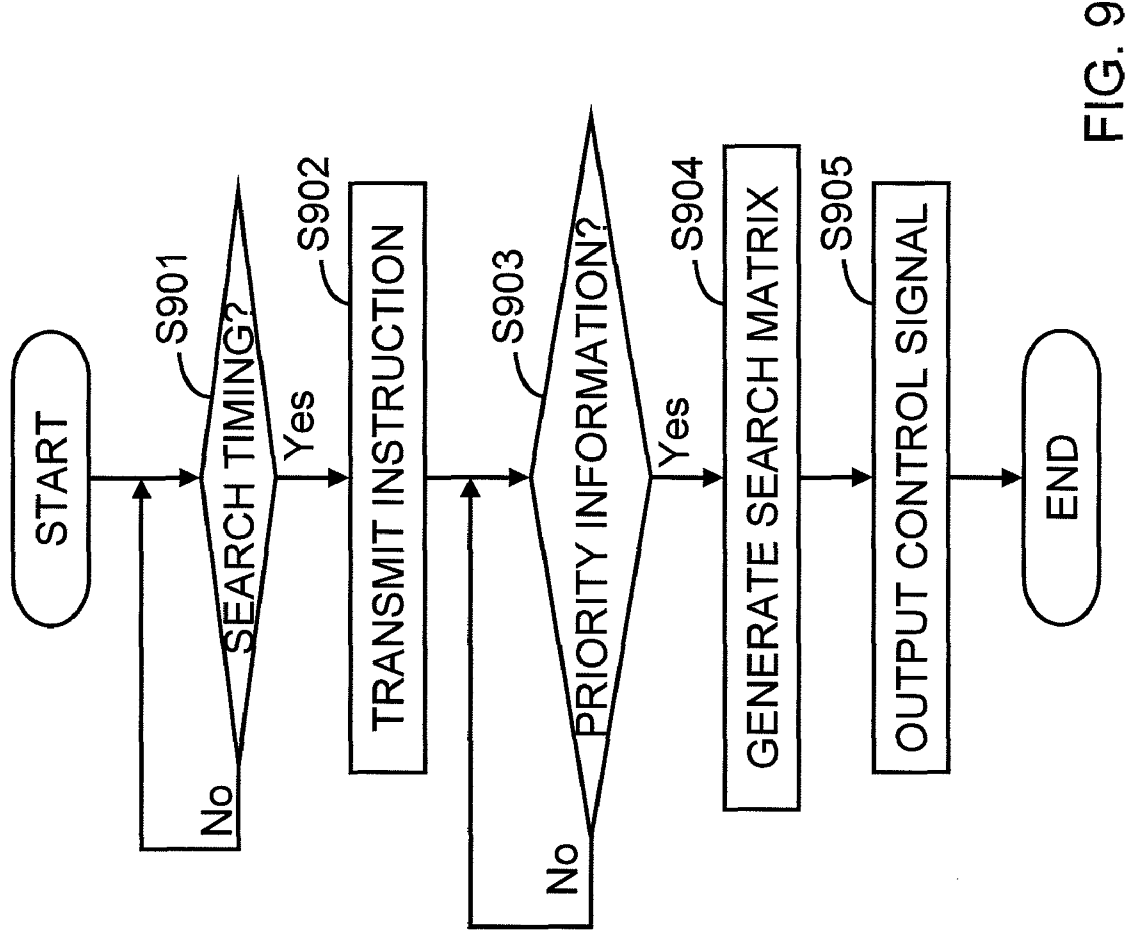
FIG. 9 is a flowchart illustrating a flow of search matrix generation process.
Figure 10:
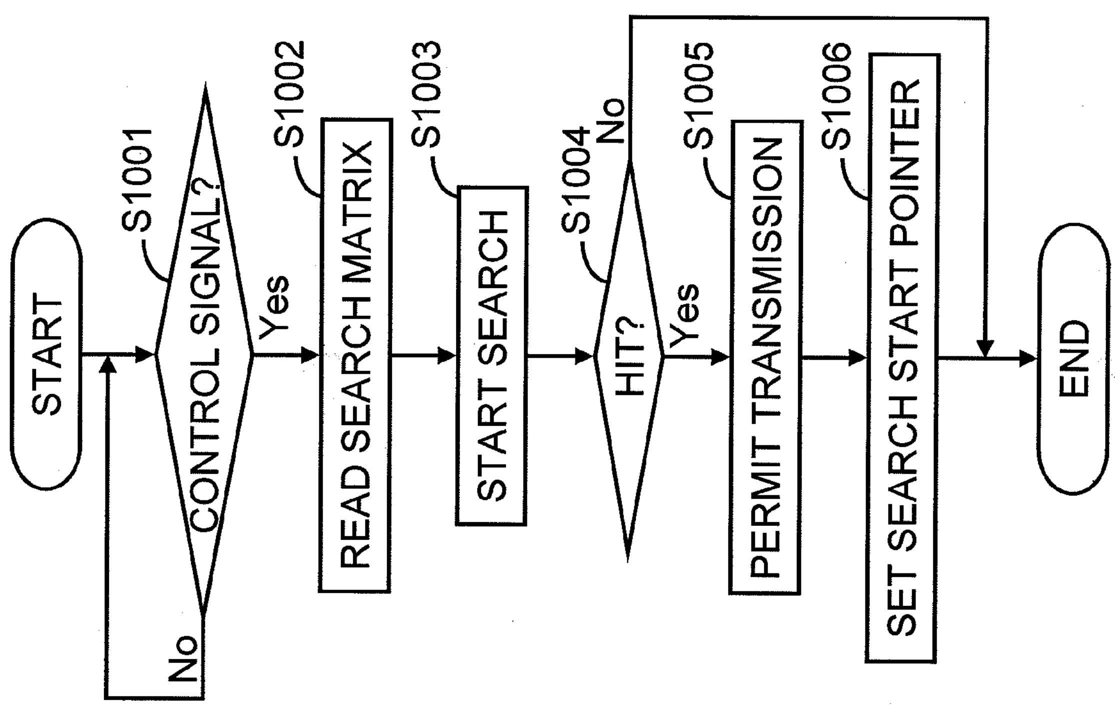
FIG. 10 is a flowchart illustrating a flow of transmission permission selection process.

Next, the process performed by the post-stage packet controller 50 will be described with reference to FIGS. 9 and 10. FIG. 9 is a flowchart illustrating a flow of search matrix generation process. FIG. 10 is a flowchart illustrating a flow of transmission permission selection process.

As shown in FIG. 9, at the timing of the search start instruction (step S901: Yes), the search matrix generator 81 transmits a search start instruction to the pre-stage packet controllers 10 (step S902). When the post-stage packet controller 50 has received priority information from the pre-stage packet controllers 10 (step S903: Yes), the search matrix generator 81 converts the matrix stored in the search matrix storage 71 into a search matrix on the basis of the received priority information (step S904), and outputs a control signal to the transmission permitter 82 (step S905).

As shown in FIG. 10, when the transmission permitter 82 has received the control signal (step S1001: Yes), the transmission permitter 82 reads the search matrix from the search matrix storage 71 (step S1002), and searches for a cell in which on-information is actually embedded, in a predetermined order, starting from a cell in which the search start pointer is embedded (step S1003). When the transmission permitter 82 has found a cell in which the on-information embedded (step S1004: Yes), the post-stage packet controller 50 transmits an instruction on packet transmission permission to the pre-stage packet controller 10 identified by the pre-stage packet controller identifier corresponding to the column of the cell found to be embedded with the search start pointer (step S1005). After transmitted the instruction on packet transmission permission, the post-stage packet controller 50 extracts the search start pointer from the original cell and embeds it in a next cell (step S1006), thereby ending the process.

Last, an example in which the post-stage packet controller 50 transmits an instruction on packet transmission permission to any of the three pre-stage packet controllers 10 will be described with reference to FIGS. 11A to 11G and 12H to 12O. FIGS. 11A to 11G and 12H to 12O are diagrams illustrating an example of a bandwidth control. FIGS. 11A to 11G and 12H to 12O show transition of states of search matrixes stored in the three pre-stage packet controllers 10 and the post-stage packet controller 50. Each diagram shows, starting from the left, a search matrix stored in the pre-stage packet controller 10 identified by the pre-stage packet controller identifier "A1" (hereinafter, referred to as the "A1" pre-stage packet controller 10, and likewise, "A2" pre-stage packet controller 10 and "A3" pre-stage packet controller 10), a search matrix stored in the "A2" pre-stage packet controller 10, a search matrix stored in the "A3" pre-stage packet controller 10, and a search matrix stored in the post-stage packet controller 50. In FIGS. 11A to 11G and 12H to 12O, c1 to c9 related to the columns in each search matrix are used as an identifier of a user in the following description. Information related to the rows or the columns in each search matrix is the same as shown in FIG. 3 or 6, so the description thereof is omitted here.

Figures 11A, 11B, 11C, 11D:
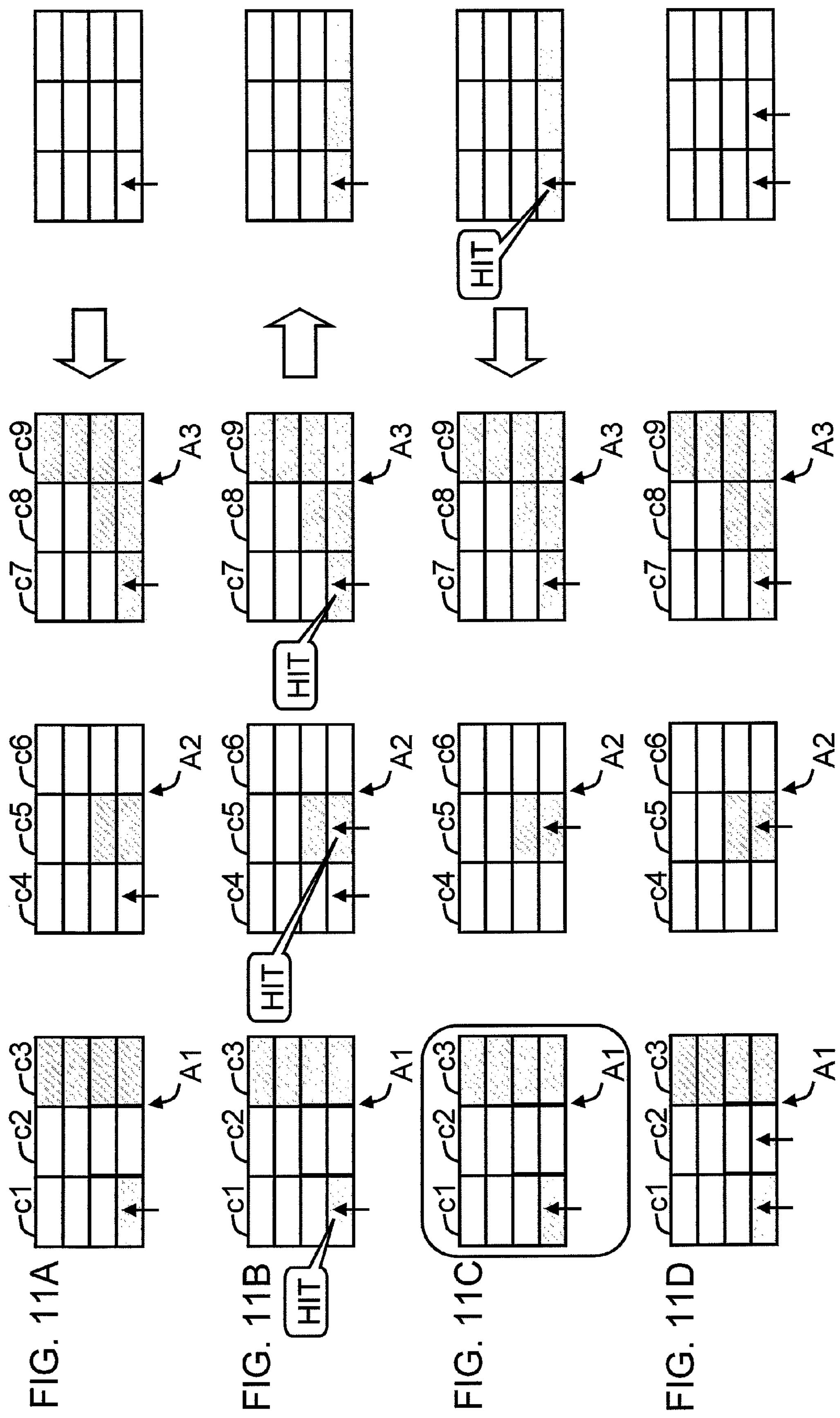
FIGS. 11A-11G and 12H-12O are diagrams illustrating an example of a bandwidth control.

In FIG. 11A, the post-stage packet controller 50 transmits a search start instruction to each of the pre-stage packet controllers 10.

In FIG. 11B, each of the pre-stage packet controllers 10 searches a search matrix, and consequently transmits priority information "1" to the post-stage packet controller 50. The post-stage packet controller 50 then generates a search matrix on the basis of the priority information "1" received from each of the pre-stage packet controllers 10.

In FIG. 11C, the post-stage packet controller 50 searches the search matrix, and consequently transmits an instruction on packet transmission permission to the "A1" pre-stage packet controller 10. On receiving the instruction on packet transmission permission from the post-stage packet controller 50, the "A1" pre-stage packet controller 10 transmits packets of a user c1 to the post-stage packet controller 50.

In FIG. 1D, the "A1" pre-stage packet controller 10 which has been permitted for packet transmission moves the search start pointer to a next cell. The post-stage packet controller 50 also moves the search start pointer to a next cell.

Figures 11E, 11F, 11G:
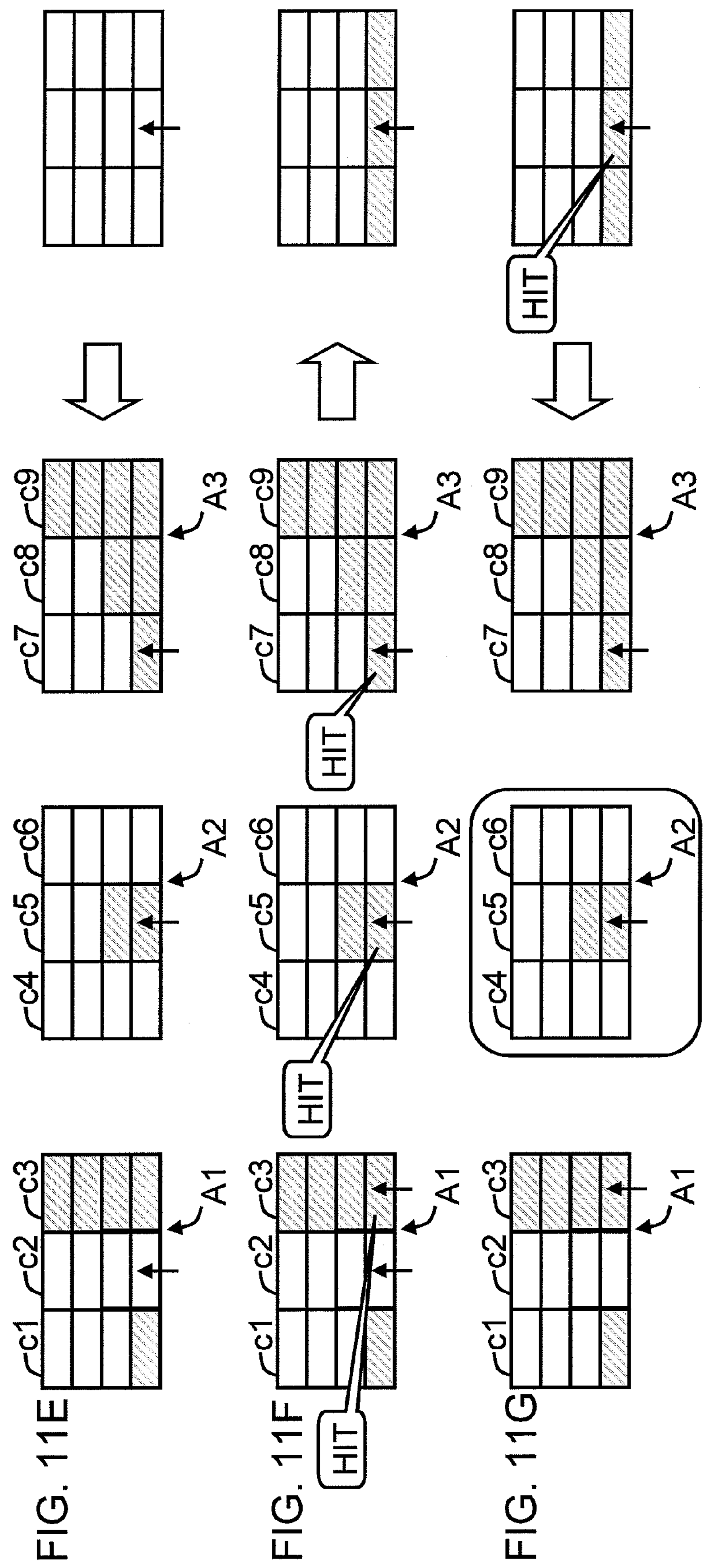

In FIG. 11E, the post-stage packet controller 50 transmits a search start instruction to each of the pre-stage packet controllers 10.

In FIG. 11F, each of the pre-stage packet controllers 10 searches the search matrix, and consequently transmits priority information "1" to the post-stage packet controller 50. The post-stage packet controller 50 then generates a search matrix on the basis of the priority information "1" received from each of the pre-stage packet controllers 10.

In FIG. 11G, the post-stage packet controller 50 searches the search matrix, and consequently transmits an instruction on packet transmission permission to the "A2" pre-stage packet controller 10. On receiving the instruction on packet transmission permission from the post-stage packet controller 50, the "A2" pre-stage packet controller 10 transmits packets of a user c5 to the post-stage packet controller 50.

Figures 12H, 12I, 12J, 12K:
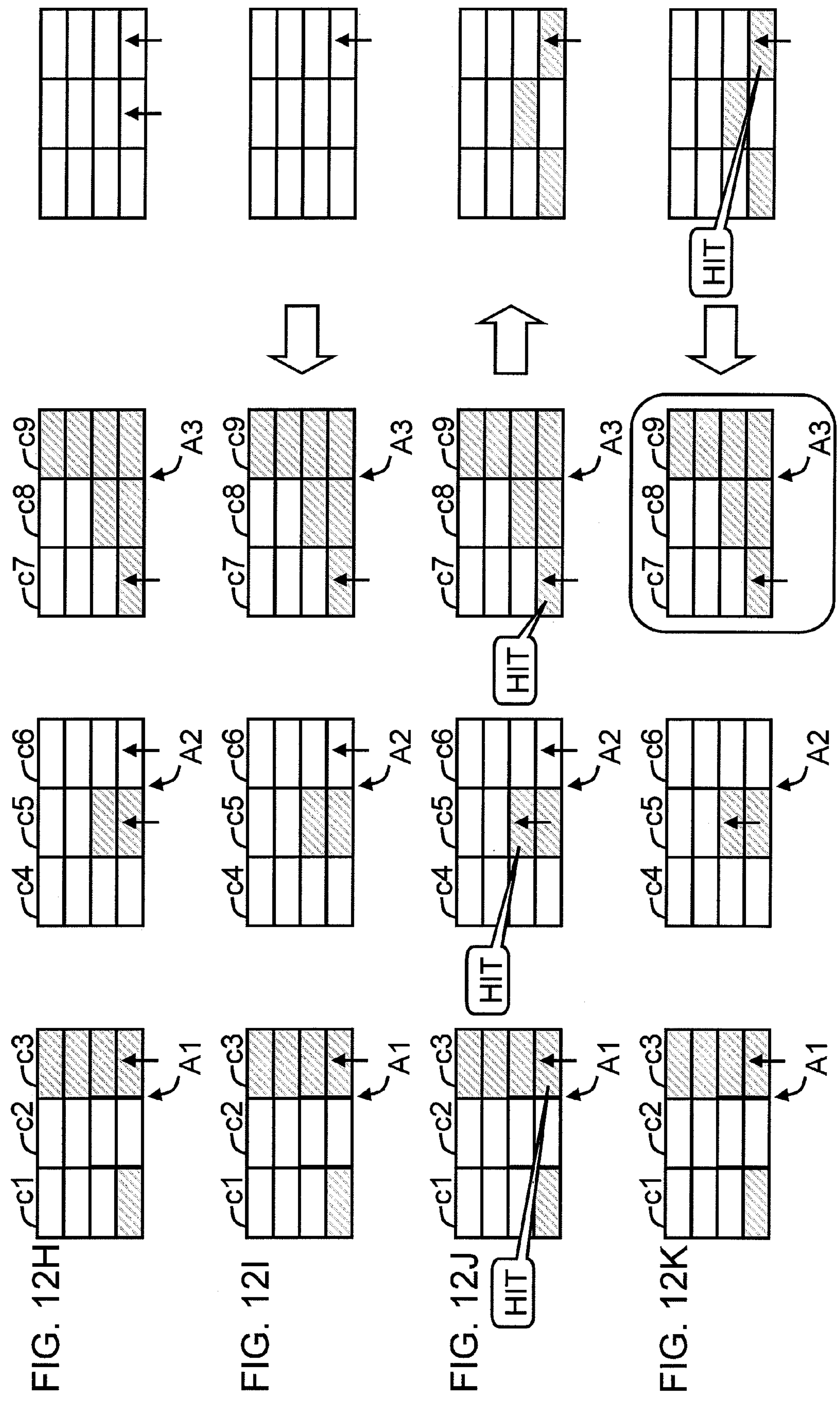

In FIG. 12H, the "A2" pre-stage packet controller 10 which has been permitted for packet transmission moves the search start pointer to a next cell. The post-stage packet controller 50 also moves the search start pointer to a next cell.

In FIG. 12I, the post-stage packet controller 50 transmits a search start instruction to each of the pre-stage packet controllers 10.

In FIG. 12J, each of the pre-stage packet controllers 10 searches the search matrix. Each of the "A1" pre-stage packet controller 10 and the "A3" pre-stage packet controller 10 consequently transmits priority information "1" to the post-stage packet controller 50, while the "A2" pre-stage packet controller 10 consequently transmits priority information "2" to the post-stage packet controller 50. The post-stage packet controller 50 then generates a search matrix on the basis of the priority information "1" and the priority information "2" received from the pre-stage packet controllers 10.

In FIG. 12K, the post-stage packet controller 50 searches the search matrix, and consequently transmits an instruction on packet transmission permission to the "A3" pre-stage packet controller 10. On receiving the instruction on packet transmission permission from the post-stage packet controller 50, the "A3" pre-stage packet controller 10 transmits packets of a user c7 to the post-stage packet controller 50.

Figures 12L, 12M, 12N, 12O:
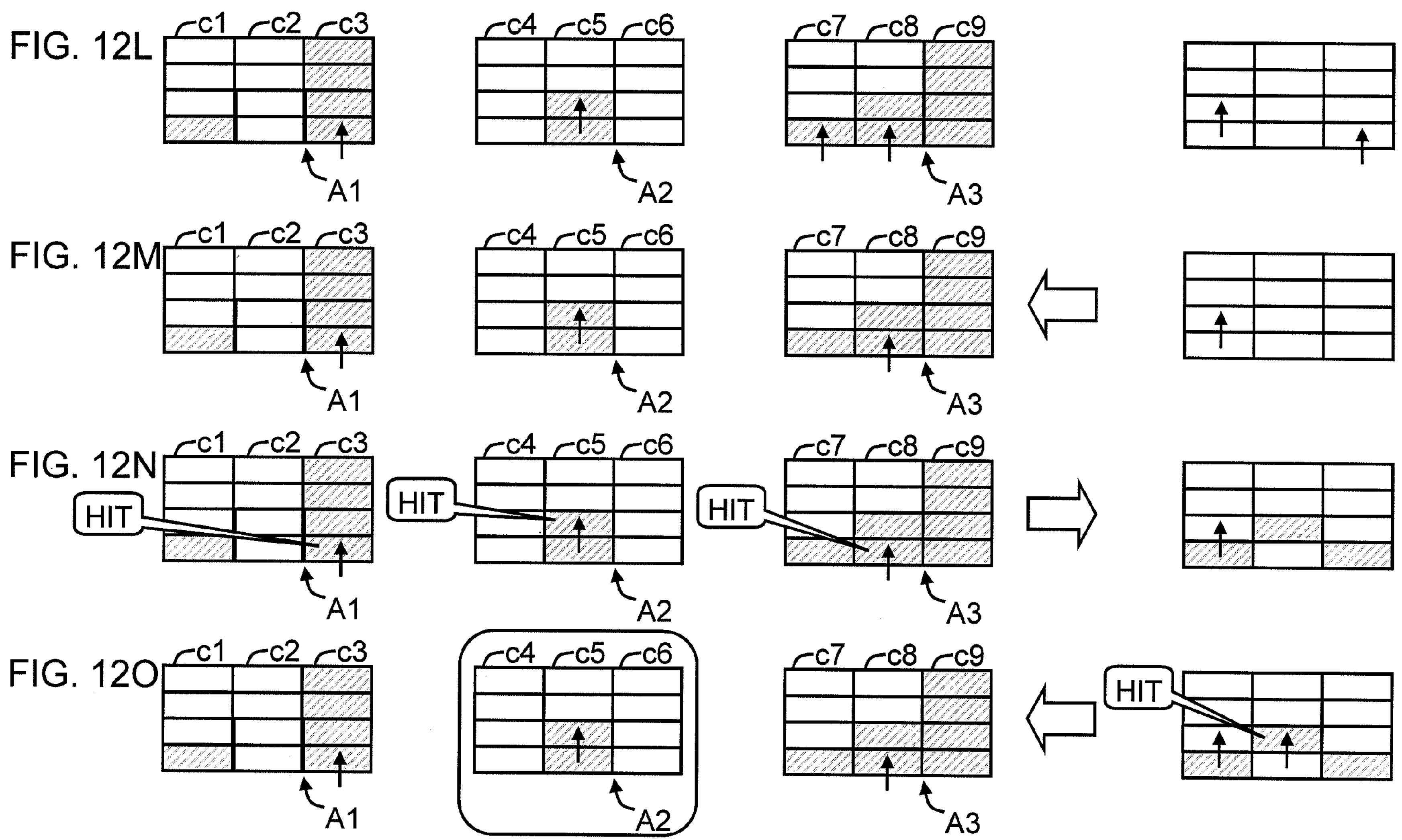

In FIG. 12L, the "A3" pre-stage packet controller 10 which has been permitted for packet transmission moves the search start pointer to a next cell. The post-stage packet controller 50 also moves the search start pointer to a next cell.

In FIG. 12M, the post-stage packet controller 50 transmits a search start instruction to each of the pre-stage packet controllers 10.

In FIG. 12N, each of the pre-stage packet controllers 10 searches the search matrix. Each of the "A1" pre-stage packet controller 10 and the "A3" pre-stage packet controller 10 consequently transmits priority information "1" to the post-stage packet controller 50, while the "A2" pre-stage packet controller 10 consequently transmits priority information "2" to the post-stage packet controller 50. The post-stage packet controller 50 then generates a search matrix on the basis of the priority information "1" and the priority information "2" received from the pre-stage packet controllers 10.

In FIG. 12O, the post-stage packet controller 50 searches the search matrix, and consequently transmits an instruction on packet transmission permission to the "A2" pre-stage packet controller 10. On receiving the instruction on packet transmission permission from the post-stage packet controller 50, the "A2" pre-stage packet controller 10 transmits packets of the user c5 to the post-stage packet controller 50.

In the above-described processing flow, the post-stage packet controller 50 successively transmits instructions on packet transmission permission to the three pre-stage packet controllers 10.

As described above, according to the first embodiment of the present invention, a plurality of pre-stage controllers transmit priority information derived from contract provisions contained in contracts on user devices to a post-stage packet controller, and a pre-stage controller which has received an instruction on packet transmission permission from the post-stage packet controller transmits a packet to the post-stage packet controller. On the other hand, the post-stage packet controller selects a pre-stage packet controller to be actually given packet transmission permission on the basis of the priority information, and transmits instruction on packet transmission permission to the selected pre-stage packet controller. This may ensure fairness among users connected to different pre-stage controllers, and to easily increase the number of users.

That is, since the post-stage packet controller, performing a key administrative role, instructs each of the pre-stage packet controllers to transmit priority information, selects a pre-stage packet controller to be permitted a packet transmission on the basis of the received priority information, and instructs the selected pre-stage packet controller to transmit a packet, it may ensure fairness among users connected to different pre-stage controllers.

Also, since a single pre-stage packet controller is instructed to transmit a packet, the utilized bandwidth for packet to be transmitted from the pre-stage packet controller to the post-stage packet controller is prevented from exceeding the output bandwidth. This eliminates the need for a large capacity of buffer in the post-stage packet controller, and then the number of users may be easily increased.

Moreover, according to the first embodiment, since the priority information or the packet transmission permission is transmitted by utilizing an unused bandwidth consisting of an inter-packet spacing, the system may be operated without a large-scale work such as repair work, as compared with techniques not utilizing the unused bandwidth but providing exclusive communication pathways.

Second Embodiment

While the first embodiment of the present invention has been described, other than the first embodiment described above, the present invention may be implemented in various other configurations. So, other embodiments will be described by classifying them into (1) to (3) as follows.

(1) Transmission of Packets

In the first embodiment described above, the description has been made of the case where the pre-stage packet controllers, connected to the post-stage packet controller, transmit packets by receiving instructions on packet transmission permission from the post-stage packet controller. However, the pre-stage packet controllers may be used as a type which communicates by itself with a node included in a network. That is, when being connected by itself to the node included in a network, a pre-stage packet controller performs bandwidth control as contracted on packets received from user devices, and transmits them to the node included in the network.

(2) System Configuration Etc.

The components of the devices in the drawings are functional and conceptual and do not necessarily have to be physically configured as illustrated. That is, specific configurations of distribution and integration of the devices are not limited to the configurations in the drawings, and all or some of the configurations can be configured by functionally or physically distributing and integrating in arbitrary units according to various loads or usage situations, etc., such as to integrate the search matrix generator 81 and the transmission permitter 82. Furthermore, all or arbitrary parts of the processing functions provided by the devices can be realized by a CPU (Central Processing Unit) or by programs interpreted and executed by the CPU, or can be implemented as hardware with a wired logic.

Of processes described in the first embodiment, all or parts of the processes which are described as being automatically performed may also be manually performed. Alternatively, all or parts of the processes which are described as being manually performed may be automatically performed by known methods. For example, in the above-described embodiment, a description has been given on the case where an operator performs the creation of matrixes and the operation for relating various pieces of information to rows and columns. However, the arrangement may also be such that each of the pre-stage packet controllers transmits contract provisions on the user device to the post-stage packet controller, and that the post-stage packet controller performs a computation, to thereby automatically perform the above-described creation of matrixes and the relating of various pieces of information to rows and columns. Besides, information including various pieces of data and parameters shown in the above descriptions and drawings, such as processing procedures, control procedures, and specified notation (e.g., "first" or "second" which is prefixed to the buffer) can be arbitrarily changed unless otherwise stated.

(3) Bandwidth Control Programs

Figure 13:
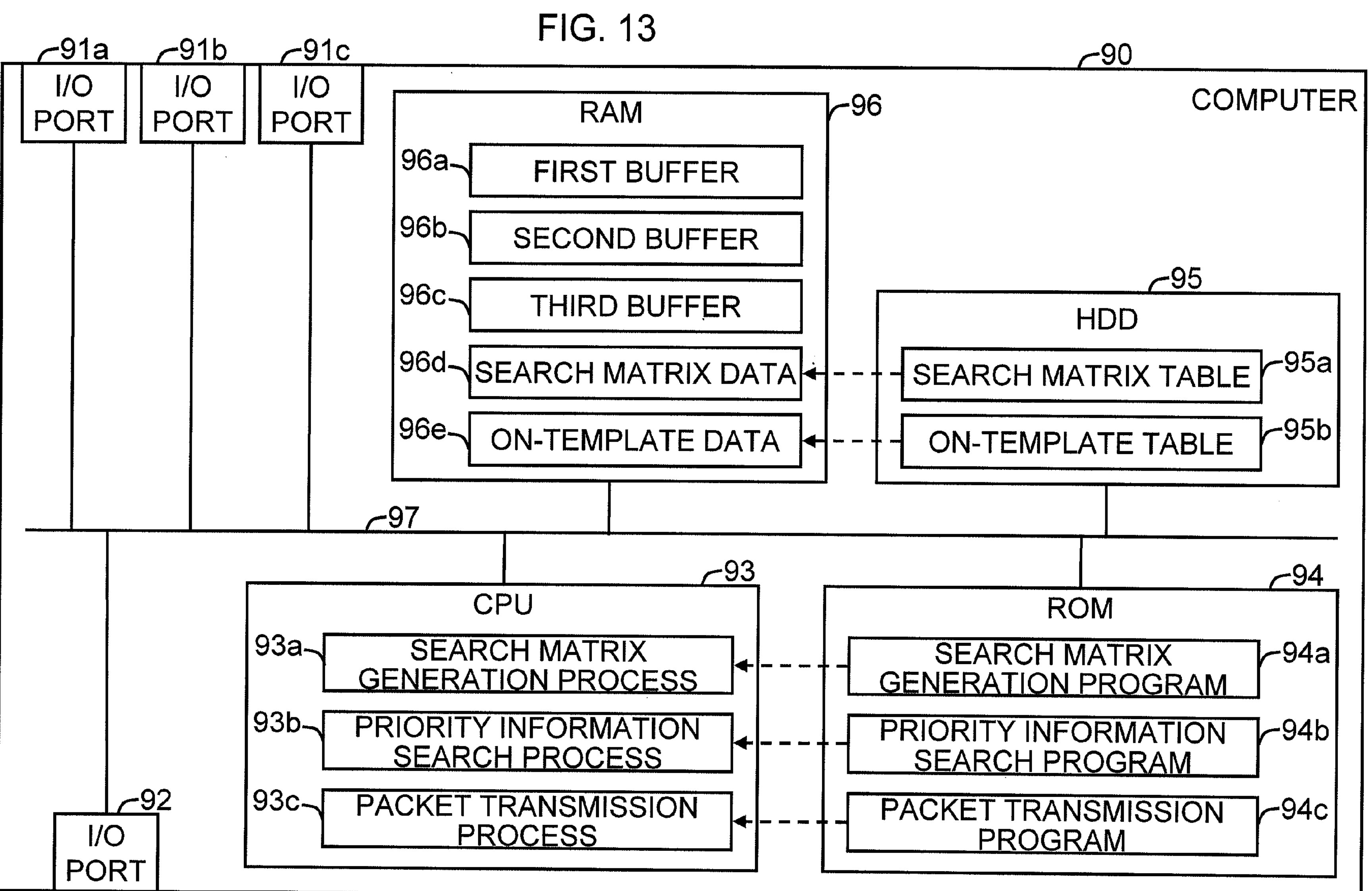
FIG. 13 is a diagram illustrating a computer for executing a pre-stage control program.
Figure 14:
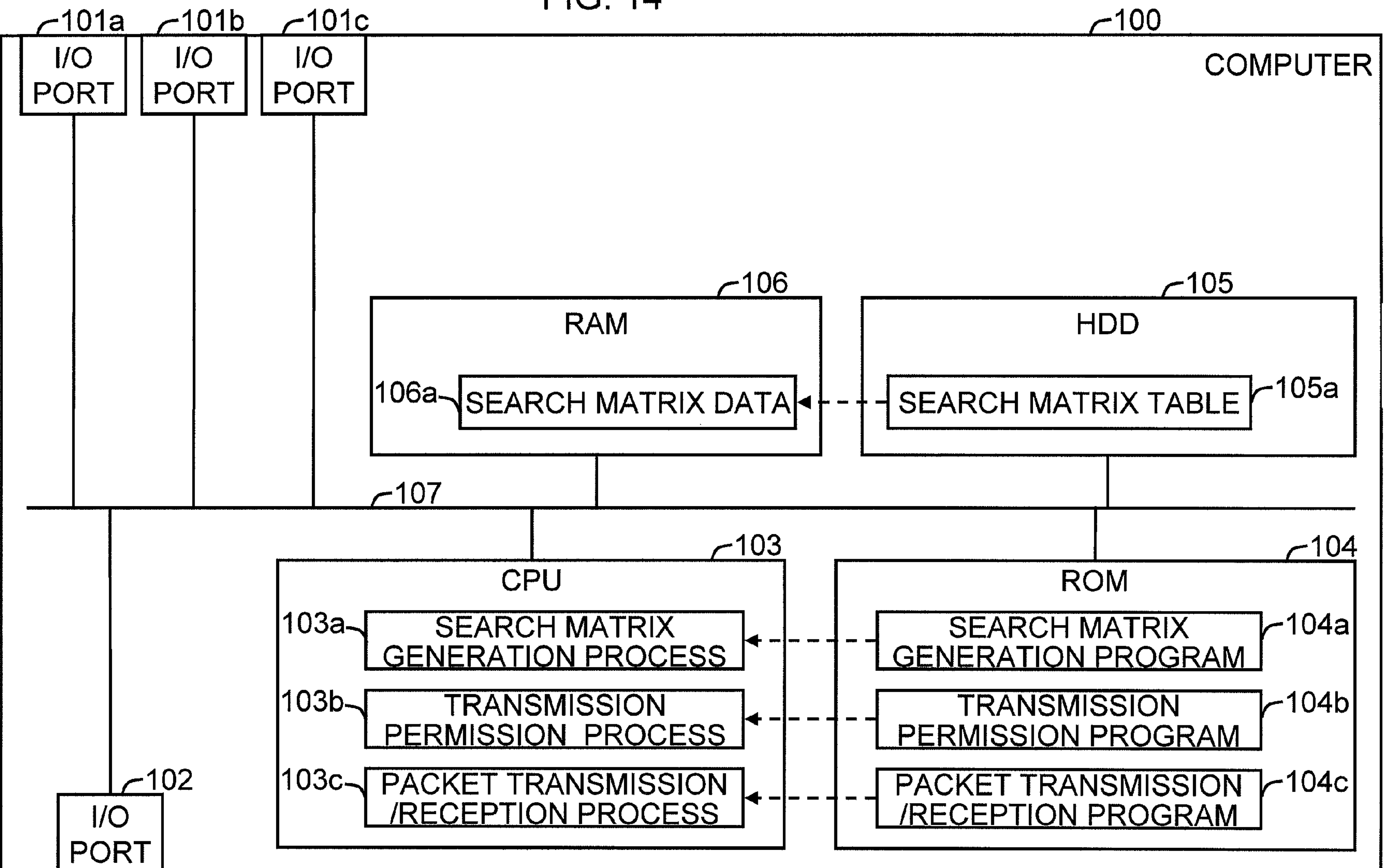
FIG. 14 is a diagram illustrating a computer for executing a post-stage control program.

In the above-described first embodiment, the case where various processes are implemented by the hardware logic has been described. However, the present invention is not limited to this case. The processes may be implemented by computers, by executing programs prepared in advance. Hereinafter, with reference to FIGS. 13 and 14, examples are shown in which a computer for executing a pre-stage packet control program and a computer for executing a post-stage packet control program, the former and latter computers, respectively, having the same functions as those of the pre-stage packet controller and the post-stage packet controller in the bandwidth control system shown in the above-described first embodiment. FIG. 13 is a diagram illustrating a computer for executing a pre-stage control program. FIG. 14 is a diagram illustrating a computer for executing a post-stage control program.

As shown in FIG. 13, the computer 90 as a pre-stage packet controller is configured by connecting I/O ports 91*a*, 91*b*, and 91*c*, an I/O port 92, a CPU 93, a ROM (Read Only Memory) 94, an HDD (Hard Disk Drive) 95, and a RAM 96 by a bus 97 etc.

The ROM 94 stores in advance a pre-stage packet control program which makes a computer perform the same function as that of the pre-stage packet controller 10 shown in the first embodiment, that is, as shown in FIG. 13, the ROM 94 stores in advance the pre-stage packet control program including a search matrix generation program 94*a*, a priority information search program 94*b*, and a packet transmission program 94*c*. Here, the search matrix generation program 94*a*, the priority information search program 94*b*, and the packet transmission program 94*c* may be integrated or distributed as appropriate, as in the case of the components of the pre-stage packet controllers 10 shown in FIG. 2.

By the CPU 93 reading the search matrix generation program 94*a*, the priority information search program 94*b*, and the packet transmission program 94*c* from the ROM 94 and executing them, the search matrix generation program 94*a*, the priority information search program 94*b*, and the packet transmission program 94*c*, respectively, serves as a search matrix generation process 93*a*, a priority information search process 93*b*, and a packet transmission process 93*c*, as shown in FIG. 13. Here, the search matrix generation process 93*a*, the priority information search process 93*b*, and the packet transmission process 93*c*, respectively, corresponds to the search matrix generator 41, the priority information searcher 42, and the packet transmitter 43 shown in FIG. 2.

As shown in FIG. 13, the HDD 95 stores a search matrix table 95*a* and an on-template table 95*b*. The search matrix table 95*a* and the on-template table 95*b*, respectively, corresponds to the search matrix storage 32 and the on-template storage 33 shown in FIG. 2. The CPU 93 reads search matrix data 96*d* and on-template data 96*e* from the search matrix table 95*a* and the on-template table 95*b*, respectively, and after having stored them in the RAM 96, the CPU 93 controls the transmission of packets on the basis of the search matrix data 96*d* and the on-template data 96*e*.

Next, as shown in FIG. 14, the computer 100 as the post-stage packet controller is configured by connecting I/O ports 101*a*, 101*b*, and 101*c*, an I/O port 102, a CPU 103, a ROM 104, an HDD 105, and a RAM 106 by a bus 107 etc.

The ROM 104 stores in advance a post-stage packet control program which performs the same functions as that of the post-stage packet controller 50 shown in the first embodiment, that is, as shown in FIG. 14, the ROM 104 stores in advance the post-stage packet control program including a search matrix generation program 104*a*, a transmission permission program 104*b*, and a packet transmission/reception program 104*c*. Here, the search matrix generation program 104*a*, the transmission permission program 104*b*, and the packet transmission/reception program 104*c* may be integrated or distributed as appropriate, as in the case of the components of the post-stage packet controller 50 shown in FIG. 5.

By the CPU 104 reading the search matrix generation program 104*a*, the transmission permission program 104*b*, and the packet transmission/reception program 104*c* from the ROM 104 and executing them, the search matrix generation program 104*a*, the transmission permission program 104*b*, and the packet transmission/reception program 104*c*, respectively, serves as a search matrix generation process 103*a*, a transmission permission process 103*b*, and a packet transmission/reception process 103*c*, as shown in FIG. 14. Here, the search matrix generation process 103*a*, the transmission permission process 103*b*, and the packet transmission/reception process 103*c*, respectively, corresponds to the search matrix generator 81, the transmission permitter 82, and the packet transmitter/receiver 83 shown in FIG. 5.

As shown in FIG. 14, the HDD 105 stores a search matrix table 105*a*. The search matrix table 105*a* corresponds to the search matrix storage 71 shown in FIG. 5. The CPU 103 reads search matrix data 106*a* from the search matrix table 105*a*, and after having stored it in the RAM 106, CPU 103 controls the transmission of packets on the basis of the search matrix data 106*a*.

The search matrix generation program 94*a*, the priority information search program 94*b*, the packet transmission program 94*c*, the search matrix generation program 104*a*, the transmission permission program 104*b*, or the packet transmission/reception program 104*c* described above, respectively, is not necessarily stored in the ROM 94 or the ROM 104 from the beginning. For example, these programs may be stored in a “portable physical medium” such as a flexible disk (FD), a CD-ROM (Compact Disk Read Only Memory), a magneto-optical (MO) disk, a DVD (Digital Versatile Disk) disk, or an IC (Integrated Circuit) card which is inserted into the computer 90 or the computer 100, a “fixed physical medium”, such as an HDD, which is mounted inside or outside of the computer 90 or the computer 100, or another computer (or a server) connected to the computer 90 or the computer 100 through a public line, the Internet, a LAN (Local Area Network), a WAN (Wide Area Network) or the like, and then the computer 90 or the computer 100 may read these programs from the above-described computer-readable recording medium or the like, and execute them.

As described above, the bandwidth control system according to embodiments of the present invention is effective when it includes a plurality of pre-stage packet controllers which receive packets from user devices and which transmit the packets to a post-stage packet controller, and the post-stage packet controller which receives the packets transmitted from the plurality of pre-stage packet controllers and which transmits them to a network. Especially, the bandwidth control system according to embodiments of the present invention is suitable for ensuring fairness among users connected to different pre-stage packet controllers, and for easily increasing the number of users.

What is claimed is:

1. A bandwidth control system comprising:

a plurality of pre-stage controllers, said pre-stage controllers receiving a packet from each of plural user devices, deriving priority information on the basis of a sum of ratios of user bandwidths of respective ones of the plural user devices, the user bandwidths being contractual minimum bandwidths of the respective ones of the plural user devices in connection with input/output ports, and the ratios each being of a corresponding user bandwidth relative to a whole bandwidth of an input/output port used by the corresponding user device, transmitting the priority information, and transmitting the packet upon receiving packet transmission permission; and a post-stage controller for receiving the priority information from the pre-stage controllers, selecting, on the basis of the priority information, one of the pre-stage controllers to be given the packet transmission permission, transmitting the packet transmission permission to the selected pre-stage controller, receiving the packet from the selected pre-stage controller, and transmitting the packet to the network.

2. The bandwidth control system of claim 1, wherein the pre-stage controllers transmit the priority information to the post-stage controller by utilizing an unused bandwidth consisted of an inter-packet spacing, and the post-stage controller transmits the packet transmission permission to the selected pre-stage controller by utilizing the unused bandwidth.

3. A non-transitory program storage medium readable by a computer, said program storage medium storing a program of instructions for the computer acting as a bandwidth control system including a plurality of pre-stage controllers and a post-stage controller, said bandwidth control system executing a bandwidth control method comprising:

receiving, by the pre-stage controllers, a packet from each of plural user devices;

deriving, by the pre-stage controllers, priority information on the basis of a sum of ratios of user bandwidths of respective ones of the plural user devices, the user bandwidths being contractual minimum bandwidths of the respective ones of the plural user devices in connection with input/output ports, and the ratios each being of a corresponding user bandwidth relative to a whole bandwidth of an input/output port used by the corresponding user device;

transmitting, by the pre-stage controllers, the priority information to the post-stage controller;

receiving, by the post-stage controller, the priority information from the pre-stage controllers;

selecting, by the post-stage controller, on the basis of the priority information, one of the pre-stage controllers to be given packet transmission permission;

transmitting, by the post-stage controller, the packet transmission permission to the selected pre-stage controller;

transmitting, by the selected pre-stage controller, the packet upon receiving packet transmission permission from the post-stage controller;

receiving, by the post-stage controller, the packet from the selected pre-stage controller; and transmitting, by the post-stage controller, the packet to the network.

4. A bandwidth control method performed by a bandwidth control system including a plurality of pre-stage controllers and a post-stage controller, said bandwidth control method comprising:

receiving, by the pre-stage controllers, a packet from each of plural user devices;

deriving, by the pre-stage controllers, priority information on the basis of a sum of ratios of user bandwidths of respective ones of the plural user devices, the user bandwidths being contractual minimum bandwidths of the respective ones of the plural user devices in connection with input/output ports, and the ratios each being of a corresponding user bandwidth relative to a whole bandwidth of an input/output port used by the corresponding user device;

transmitting, by the pre-stage controllers, the priority information to the post-stage controller;

receiving, by the post-stage controller, the priority information from the pre-stage controllers;

selecting, by the post-stage controller, on the basis of the priority information, one of the pre-stage controllers to be given packet transmission permission;

transmitting, by the post-stage controller, the packet transmission permission to the selected pre-stage controller;

transmitting, by the selected pre-stage controller, the packet upon receiving packet transmission permission from the post-stage controller;

receiving, by the post-stage controller, the packet from the selected pre-stage controller; and transmitting, by the post-stage controller, the packet to the network.

* * * * *